Figure 1:
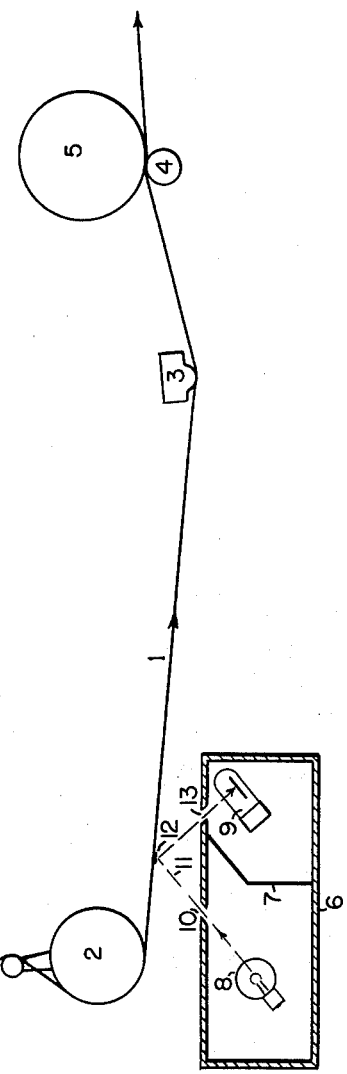

March 27, 1962 W. C. GILMAN 3,027,430
ELECTRONIC CUE INSERTER
Filed Jan. 9, 1959 3 Sheets-Sheet 1

INVENTOR.
WARREN C. GILMAN
BY Harry R. Lubcke
AGENT

March 27, 1962

W. C. GILMAN 3,027,430

ELECTRONIC CUE INSERTER

Filed Jan. 9, 1959

3 Sheets-Sheet 2

*INVENTOR.*
WARREN C. GILMAN
BY
*Harry R. Lubcke*
AGENT

INVENTOR.
WARREN C. GILMAN
BY Harry R. Lubcke
AGENT

United States Patent Office 3,027,430
Patented Mar. 27, 1962

3,027,430
ELECTRONIC CUE INSERTER
Warren C. Gilman, Los Angeles, Calif., assignor to Universal Recorders of California, Inc., Los Angeles, Calif., a corporation of California
Filed Jan. 9, 1959, Ser. No. 785,965
5 Claims. (Cl. 179—100.1)

My invention relates to a method and means for inserting cues in audible material or equivalent recorded information and particularly for accomplishing the same in a precise manner for changing slides in visual exhibitions or the equivalent in synchronism with the reproduction of said audible material.

The exhibition of synchronized sight and sound from a slide projector and a phonograph record has proven of value in sales and instructional presentations of information to groups of people.

One way of reproducing such sight and sound in synchronism has been described in the United States Patent to John T. Mullin, No. 2,529,097. Particularly when employing such automatic means to change the slides it is desirable to have the synchronism between the visual and aural material exact. I have found that this enables very rapid changes of slides with rapid changes in the subject matter of the aural material. The actual effects of rapid and precise sight-sound slide film presentations are far more interesting and stimulating than a mere recounting of this possibility. Although the process is not that of sound motion pictures it is easy to accomplish the same subjective effect. Normally, all slide changes are not rapid, but can be made to follow in rapid sequence where heightened interest of the audience is desired.

Phonograph record-slide projectors to exhibit my material are on the market. However, only with new re-recording apparatus according to the method of my invention can cue signals be inserted in the audio material with sufficient precision to allow rapid slide changes to be pleasingly executed. This precision improves the psychological receptivity of the audience and reduces conscious or unconscious frustration of irregular exhibition.

Briefly described, in my process the original sound is recorded on magnetic tape. At the points where the slide changes are to be made in accordance with the sound on the tape narrow reflective "patches" are placed on the tape on the side opposite to the magnetic coating. The thus cued tape is then re-run in a tape reproducer equipped with optical means to provide a short electrical pulse at a time in advance of the reproduction of the sound corresponding to the desired slide change. A finite time is required for the slide change; about a third of a second in known apparatus. Accordingly, an electrical time delay is interposed to cause the sum of that delay and the time required to change the slide to equal the original advance in time of the production of the electrical pulse. The properly delayed pulse actuates a relay and provides a change in a very low frequency tone or other means recorded on the phonograph record for subsequently energizing the slide projector apparatus.

An object of my invention is to simply insert cues in recorded information by means of high precision.

Another object is to provide accurate cues for completing slide changes upon the reproduction of selected aural material.

Another object is to simplify the re-recording operation of cued aural material.

Another object is to obtain cues from tape that are accurately timed regardless of the speed chosen for the tape, that are of short duration, and that do not affect the quality of audio reproduction from the tape.

Other objects will become apparent upon reading the following detailed specification and upon examining the accompanying drawings, in which are set forth by way of example certain embodiments of my invention.

Figure 2:
Figure 3:
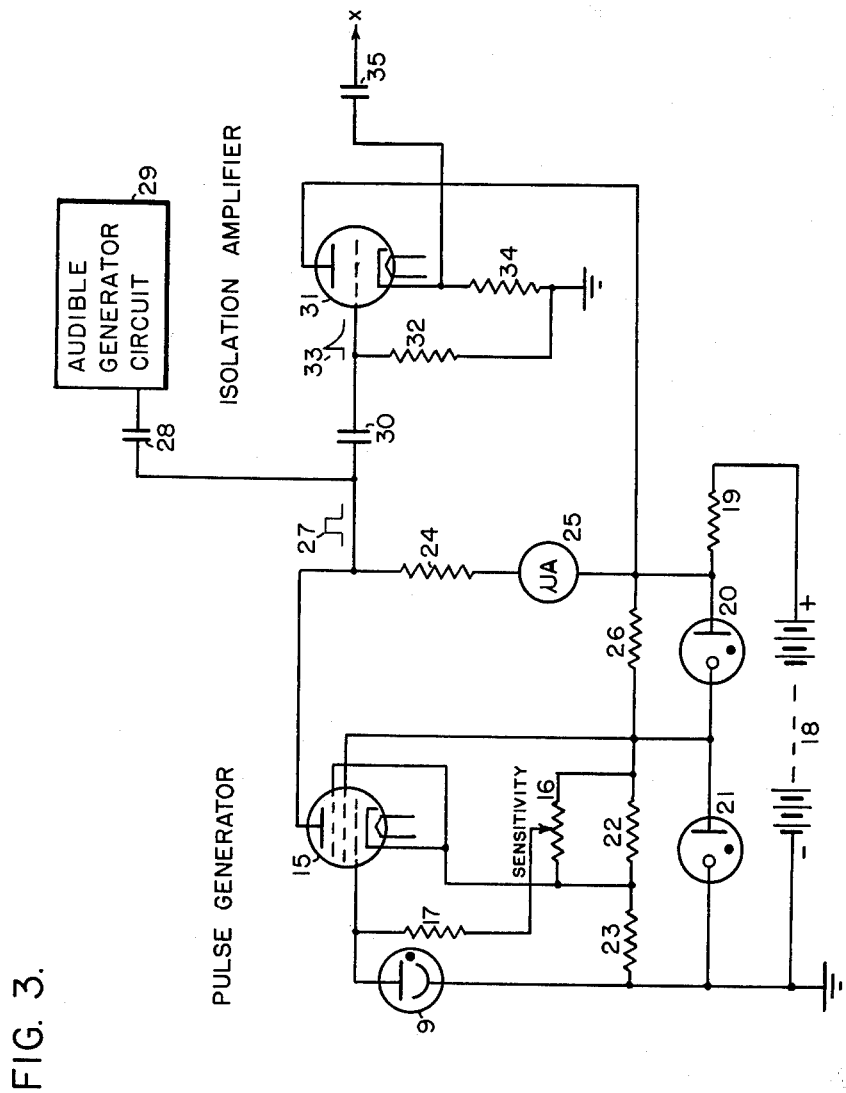
Figure 4:
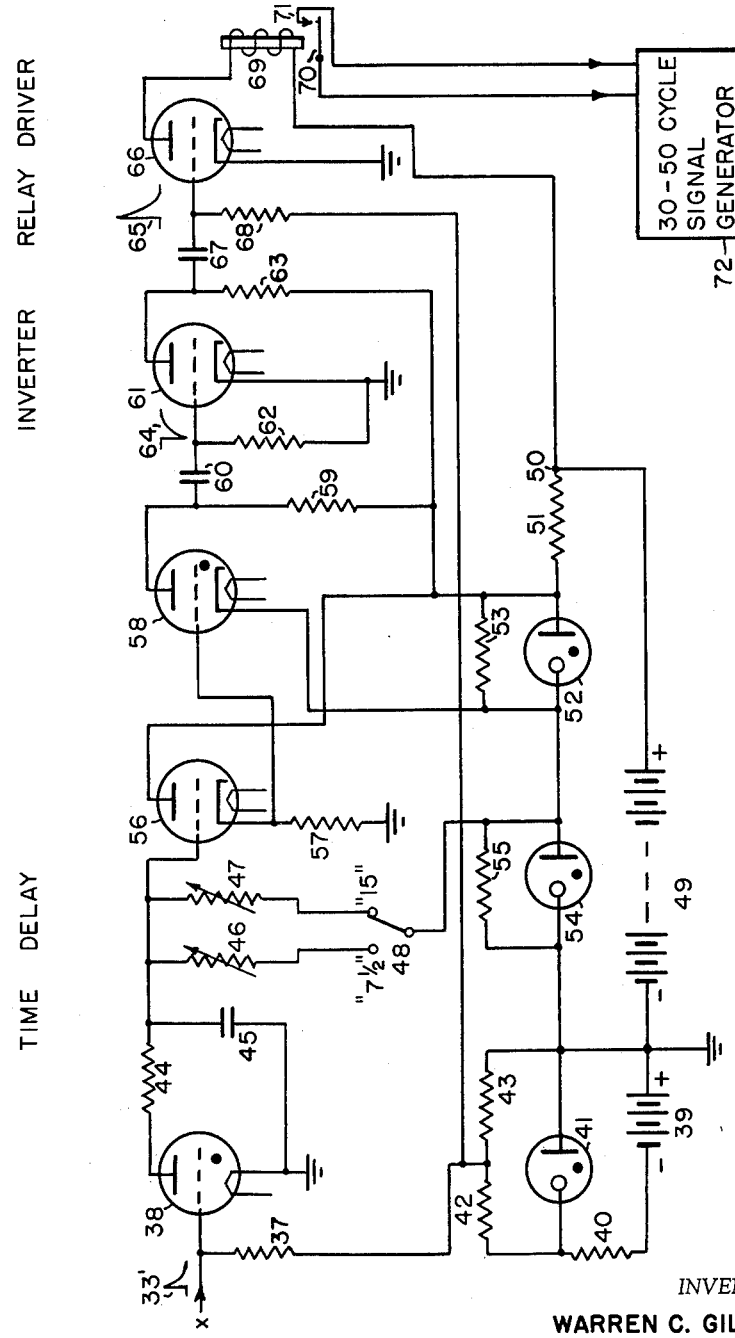

FIG. 1 shows a plan view of the optical portion of my device as attached to a magnetic tape reproducer, FIG. 2 shows an elevation view of a section of magnetic tape with a mirror indicia attached, FIG. 3 shows the initial portion of the electrical circuit of my device, and FIG. 4 shows the final portion of the electrical circuit of my device.

In FIG. 1 numeral 1 shows the magnetic sound recording tape, such as the well-known ¼" wide iron oxide tape, which is shown edge-on. This is handled by a known tape transport, such as the Ampex Series 300. The tape unwinds from a storage reel (not shown), passes around stabilizer flywheel 2, past and in contact with play head 3, is driven by drive capstan 4 in coaction with pinch wheel 5 and wound on a take-up reel (not shown).

The optical portion of my device is housed in an essentially light-tight enclosure 6, placed to the left of the transport assembly and so as to be adjacent to the tape prior to it reaching the play head 3. Enclosure 6 is provided with an essentially light-tight baffle 7, dividing the enclosure into two roughly equal compartments. In the left-hand compartment exciter lamp 8 is located and in the right-hand compartment phototube or photoelectric cell 9 is located.

A slit approximately 1/16" wide and 1/4" high is provided at 10 in the lamp compartment to allow a beam of light 11 of approximately this cross-section to pass out of the enclosure and to impinge upon tape 1 at approximately a 45° angle thereto. In FIG. 1 a reflective indicia 12 is shown on the near side of the tape instantaneously positioned to reflect the incident light through another slit of the same dimensions as the one previously mentioned and to impinge upon the photosensitive surface of phototube 9.

In FIG. 2 a side view shows the reflective indicia 12 attached to tape 1. The indicia is any shiny material, such as a thin piece of metal foil attached by a suitable adhesive to the tape. One convenient such material is a commercially obtainable magnetic tape splicing tape made of aluminum foil with a pressure-sensitive adhesive on the back. I prefer to apply a piece of this about ⅛" long by ¼" high on the magnetic tape 1. At the high-fidelity professional tape speed of 15 inches per second this produces a pulse of light lasting about 1/100" second, and at the lower speed of 7½" per second it produces a pulse of light lasting about 1/50 second. These pulse durations are short with respect to the slide change time involved and so give my system a desirable precision of operation.

It will also be noted that effective specular reflection takes place in my optical system with the slits limiting the duration of the light flash to the short intervals mentioned. I have found such an arrangement definitely superior in reliability of operation to other optical arrangements, such as a piece of white paper on the magnetic tape with a non-directed or "open" optical system, or a pencil mark on the magnetic tape with a transmissive rather than a reffective optical system. The prepared aluminum tape is easier to apply to the magnetic tape than is paper and it does not appreciably alter the flexibility of tape, since it was manufactured for splicing it. It will not rub off nor deposit on an adjacent turn of the tape when it is wound in a reel, as the opaque marking of a grease pencil is likely to do.

A mechanically contacting attachment for forming a cue pulse cannot be tolerated in work requiring professional audio fidelity because of the uneven drag of any such contacts upon the tape.

In FIG. 3 photoelectric cell 9 is the source of electrical pulse energy, optically derived from the weightless contact of the light beam with the reflective indicia on the audio tape as has been described.

Pentode 15 amplifies the initial pulse from the photoelectric cell and for identification is termed the pulse generator. While my optical system produces the best ratio of wanted pulse to background or accidentally formed pulses of any of the systems mentioned I improve reliability to a high level by forming a threshold circuit at the input of vacuum tube 15.

The cathode of phototube 9 is grounded and the anode is connected to the "sensitivity" or threshold control 16 through a ten megohm resistor 17. An A.C. to D.C. power supply or the equivalent battery 18 as shown is the source of high voltage D.C. potential for this device. Through resistor 19, having a resistance of a few thousand ohms, this potential is impressed across two gaseous voltage control tubes in series; tube 20 having an operating constant voltage drop of 75 volts and tube 21 of 105 volts. The junction between the two, i.e., at a potential of 105 volts above ground, connects to the high voltage end of control 16. Since this control is in shunt to resistor 22, which latter is in series with resistor 23 to ground and has a resistance five times as great as the former, the potential at the sliding contact of control 16 may be varied from approximately 80 to 105 volts.

A portion of this potential drops across high resistor 17 and the rest across phototube 9. The cathode and suppressor of tube 15 are connected to the plus 80 volt connection at the junction between resistors 22 and 23. The screen grid is connected to the junction between regulator tubes 20 and 21 and thus is at a potential of 105 volts above ground. The plate is connected at the high voltage end of the seriesed regulator tubes and thus has a supply voltage of 180 volts. A plate resistor 24, having a resistance of ¼ megohm, and an indicating microammeter 25 are in series between the voltage source and the plate of the tube. The tube draws a plate current of the order of 100 micro-amperes. Resistor 26, having a resistance of 7,500 ohms, completes the resistor voltage divider in shunt to the regulator tube pair 20, 21.

Sensitivity control 16 is adjusted until each passage of a reflective indicia 12 causes a square-topped pulse 27 to occur at the plate of tube 15, but so that possible small random reflectances fortuitously reflected from the tape itself do not give an output.

Pulse 27 is conveyed through capacitor 28 of .02 microfarad (mfd.) capacitance to an audible generator circuit 29 to be described later. It is also conveyed through a similar capacitor 30 to isolation amplifier 31. This is a triode. A grid resistor 32 of two megohms resistance causes pulse 27 to be differentiated to pulse 33, having a sharp rise and approximately an exponential decay. This pulse is impressed upon the grid of tube 31. This tube is connected as a cathode-follower, and so a pulse of the same shape and same voltage amplitude appears at the cathode thereof. A resistor of a tenth megohm resistance connects the cathode to ground. The plate of triode 31 connects directly to the full regulated voltage at the junction between resistor 19 and regulator tube 20. Isolation amplifier 31 serves to isolate audible generator circuit 29 from the time delay circuits which follow the isolation amplifier. If the audible generator is not required in any particular embodiment the isolation amplifier is not needed.

The output of amplifier 31 is conveyed to the delay circuits of FIG. 4 via coupling capacitor 35 of .05 mfd. capacitance. In FIG. 4 resistor 37 has a resistance of one megohm and is the grid return resistor for gas triode 38. This gas tube may be a 2A4G. The grid thereof is given a fixed negative bias from a negative power supply or equivalent battery 39, having a voltage of the order of 110 volts D.C. In series therewith is thousand ohm resistor 40 and voltage regulator tube 41, having a constant voltage drop of 75 volts. Voltage divider resistors 42 and 43 have values of 6,000 and 2,000 ohms, respectively, and thus the potential at the junction thereof is approximately 17 volts negative with respect to ground. This is the bias impressed upon the supply end of resistor 37 to bias tube 38.

Tube 38 is a relaxation oscillator. A plate-current-limiting resistor 44 of a few hundred ohms resistance connects directly to the plate of the gaseous tube and a 1 mfd. capacitor 45 connects to the opposite end of the resistor and to ground. Between the capacitor-resistor junction and a source of plate voltage are connected two variable resistors and a single pole double throw switch arranged for alternate use of the resistors. Resistor 46 has a maximum value of one megohm and resistor 47 a maximum value of a fourth megohm. Switch 48 is labeled "7½" at the contact which connects to the one megohm resistor and "15" at the other contact. This part of the circuit selects the proper delay for the electrical pulse depending upon the speed of tape transport, as will be further explained later.

In somewhat the same manner as in the previously described positive voltage supply, an A.C. to D.C. supply of 250 volts or an equivalent battery 49 is connected between ground and a positive plate supply terminal 50. In a shunt circuit between these points are; resistor 51 of 2,000 ohms resistance, voltage regulator tube 52 shunted by 7,500 ohm resistor 53, and voltage regulator tube 54 shunted by resistor 55 of 10,000 ohms resistance. Both tubes 52 and 54 operate at a constant voltage drop of 75 volts. The supply voltage terminal of switch 48 is connected to the plus 75 volts junction between the two regulator tubes.

Tube 38 is biased so that it will break down only when a positive impulse is applied to its grid; i.e., the indicia pulse 33'.

Hard triode 56 is another cathode-follower isolating amplifier. It is direct-connected to the plate end of resistors 46, 47 with respect to its input grid. Over a cathode resistor 57 of 100,000 ohms resistance the relaxation output is taken to the grid of gaseous triode 58, which may be of the 884 type. This tube is ordinarily conducting, but because of the large 100,000 ohm plate resistor 59 conduction may be stopped by a large negative pulse on the grid. Such a negative pulse occurs when the prior gas triode 38 breaks down. Accordingly, the plate of the gaseous triode 58 then suddenly becomes more positive. The grid of tube 58 is directly connected to the cathode of triode 56 and the cathode of tube 58 is connected at the plus 75 volt potential at the junction between voltage regulator tubes 52 and 54. The plate is connected through .02 mfd. capacitor 60 to the grid of hard triode 61, which triode is a pulse inverter. This tube has a grid leak 62 of one megohm and a plate resistor of 100,000 ohms. A negative pulse 64 is impressed upon the grid of tube 61 and an amplified positive pulse 65 appears at the plate. All of these pulses have the same general shape of the first differentiated pulse 33.

Pulse 65 is conveyed to relay driver hard triode vacuum tube 66 via coupling capacitor 67 of .02 mfd. capacitance and over grid return resistor 68 of two megohms resistance. The latter resistor returns to the negative 17 volt bias supply previously mentioned and so impresses this negative bias upon the control grid of tube 66. The positive amplitude of pulse 65 is considerably in excess of this voltage, however, and so a relatively strong pulse of current flows in the plate circuit of tube 66 when the indicial pulse arrives. This current is of the order of ten milliamperes and so serves to positively actuate relay 69 and close contacts 70, 71.

The relay coacts with 30–50 cycle signal generator 72. This generator is not a part of this invention per se, but contains a source of 30 cycle and another of 50 cycle sine wave electrical energy. The 50 cycle source is normally connected to the recorder for cutting the final phonograph record. When a slide is to be changed this source is disconnected therefrom and the 30 cycle source momentarily substituted. This is accomplished by the action of my relay 69 and through the contacts 70, 71 mentioned. How this frequency change causes the slide change mechanism of the user's projector to operate and the anti-false actuation obtained by the presence of the 50 cycle tone at other times is described in the Mullin patent, U.S. 2,529,097, previously mentioned.

Returning to the operation of the time delay circuit of my invention, when the second gas triode 58 is caused to cease conduction by the negative pulse from tubes 38 and 56, the positive pulse formed at the plate of triode 58 becomes a negative pulse out of hard triode 61 and does not actuate relay 69 in the plate circuit of final triode 66. The pulses occurring at this time are of opposite polarity to the actuating pulses 64, 65 previously mentioned.

Because the grid of gaseous triode 58 is directly connected through triode 56 to capacitor 45 in the plate circuit of gaseous triode 38, the grid becomes less negative with time as capacitor 45 charges from the power supply through either resistor 46 or 47. These variable resistors having been set at the proper delay value for each of the two tape transport speeds that may be used, the time interval for the positive charge on capacitor 45 to reach the firing potential of gaseous triode 58 is the delay interval desired of my apparatus. When triode 58 fires the plate suddenly becomes less positive and so negative pulse 64 is produced. This is changed to positive pulse 65 by hard triode 61 and causes the relay 69 in the plate circuit of final triode 66 to actuate.

The time intervals for my invention are established for a typical embodiment as follows. I prefer to position my optical enclosure such that the reflection from each indicia such as 12 occurs when the indicia is 7½" ahead of the place where the audio material is reproduced; i.e., at play head 3. At a tape transport speed of 7½" per second this amounts to the indicial pulse occurring one second in advance of the audio material with which it is to be associated. I have determined that the time required for a slide to actually change in the commercially available automatic slide change projectors based on the Mullin patent is ⅓ second. Accordingly, a delay of ⅔ second is required from the time the indicia passes the reflective point until relay 69 of my invention is actuated. This is easily arranged by adjustment of variable resistor 46 with switch 48 in the "7½" position. Similarly, with a tape transport speed of 15" per second the indicial pulse occurs ½ second in advance of the audio material with which it is associated. This requires a delay of ½ — ⅓ = ⅙ second, and this is arranged by adjustment of variable resistor 47 with switch 48 in the "15" position.

It will be understood that these intervals may be accurately adjusted by adjustment of either resistor 46 or 47 to compensate for minor variations in the delay of my apparatus, the delay in the 30–50 cycle generator 72, the time required for the slide changing in the final projector, etc. In practice it is found that all these variables remain quite stable and that readjustment of the resistors mentioned is the exception rather than the rule.

In one example of the use of my device, the slide was to change when a light switch was snapped on in a room. The whole automatic operation was so precise that the sound of the slide changing mechanism of the exhibiting projector masked the snap of the light switch from the phonograph record and so the sound was lost to the audience. When this was discovered another recording with this particular slide change altered in time by altering the setting of the resistor employed, 46 or 47, for this one instance, allowed the click of the light switch to be heard by the audience.

Although the time required to change the slide in the exhibiting projector is only ⅓ second, the period of application of the 30 cycle tone in the place of the 50 cycle tone has been standardized in the industry as one second. This does not interfere with the precise cuing of records made by my recording method, but only prevents slide changes from being made more frequently than about one each 1½ seconds. This, I have found, is as rapidly as is ever desired.

Returning now to audible generator circuit 29, this is merely a substantial duplication of the delay interval apparatus previously described in FIG. 4, starting with gaseous tube 38 and ending with relay 69. The purpose of this additional circuit is to place audible cues on the final phonograph record. These usually have the sound of a chime and indicate to the operator that he should press the slide change button. This is for projectors which are not equipped with the automatic slide change arrangement previously mentioned. In this simpler arrangement the relay 69 actuates an electric output chime tone device and the chime sound is recorded on the phonograph record.

While it is possible with my invention to arrange any reasonable lead time of the chime tone with respect to the accompanying audio material, it is standard practice in the industry to give the chime at exactly the time for the slide change. Accordingly, the resistor 46 in circuit 29 would normally be set for 1 second and resistor 47 for ½ second. It will be understood that the audible cue system is not intended for such rapid and precise slide changing as can be achieved with the automatic exhibition projector.

While I have described my invention particularly with respect to inserting sub-audible or audible cues in audible material intended for an audience it will be understood that my method and apparatus are suited for inserting accurately synchronized cue signals in any system having the general characteristics that have been described. One example is a system for handling coded information or information derived from a scientific process in which it is desired to impress actuation cues at selected points in the record thereof.

Although specific values of voltages and currents and specific values for the several circuit elements have been given in this specification to illustrate the invention, it will be understood that these are by way of example only, and that reasonable departures can be taken therefrom without departing from the inventive concept. Other modifications of the circuit elements, details of circuit connections and alteration of the coactive relation between elements may also be taken under my invention.

Having thus fully described my invention and the manner in which it is to be practiced, I claim:

1. Apparatus for inserting auxiliary-operation cues in recorded information comprising specularly reflective optical means positioned at the location of the corresponding information on a flexible tape record, information reproducing means, means positioned along the path of said tape record ahead of said reproducing means to produce a cue pulse from said optical means prior to the reproduction of said corresponding information, electrical means to delay said pulse an amount less than the priority of its prior production, and means to inaugurate an auxiliary-operation from said pulse.

2. Electrical apparatus for inserting slide-change cues in audio material comprising a flexible cue mirror located at the location of selected corresponding audio material on a magnetic tape record, a magnetic tape play head electro-optical means positioned in advance of said play head to produce an electrical pulse in coaction with said mirror prior to the reproduction of said corresponding audio material, adjustable electronic means to delay said pulse an amount less than the time interval of its said prior production, and means to inaugurate a slide-change signal prior to the actual desired time of said slide change.

3. Apparatus for inserting cues in recorded information comprising a reproducer of said information, a source of light and a photoelectric cell having a restricted joint optical path to produce a change of electrical output from said cell by reflection in said reproducer from reflective indicia placed upon the medium upon which said information is recorded at the location where the cue is required, means to transport said thus prepared medium past said optical path and subsequently past the reproducing means of said reproducer of information, a threshold circuit connected to said cell, time delay means connected to said threshold circuit to provide an electrical energy signal after the occurrence of said reflection, means to again record said information and means to accept said electrical energy signal to form a cue in said again-recorded information.

4. A device for inserting slide-change cues in audio material recordable upon tape comprising an audio tape reproducer, a slit source of light and a phototube having an aperture, said source and said phototube disposed to produce a change of electrical output from said phototube by specular reflection from light-reflective indicia placed upon audio-material-bearing tape at the point where a cue is to be inserted, means to transport said tape adjacent to said source and phototube in advance of the audio reproducing head, an amplifier having a threshold circuit connected to said phototube, a delay circuit connected to said amplifier to provide a voltage pulse a selected time after the occurrence of said change of electrical output, electro-mechanical means connected to said delay circuit, means to re-record said audio material and cue tone means connected to and actuated by said electro-mechanical means to alter the frequency of said cue tone upon the occurrence of said delayed pulse.

5. Electrical apparatus for inserting slide-change cues in tapped audio material comprising a tape audio reproducer mechanism, a slit source of light and a photoelectric cell having a slit aperture, said source and said cell disposed to produce an increase of electrical output of duration of the order of a hundredth second from said cell by specular reflection from a light-reflective indicium placed upon the tape bearing said audio material at each location where a slide-change is to be made, which tape is transported in front of said source and cell apertures by said reproducer mechanism, said source and cell positioned upon said mechanism adjacent to the path of said tape in advance of the audio reproducing head, an amplifier having a threshold circuit connected to said cell, an electronic time delay circuit of adjustable time delay connected to said amplifier to provide a positive voltage pulse a selected time after the occurrence of said increase of electrical output, a relay, a relay-operating amplifier stage connected to said time delay circuit and to said relay, and means to re-record said audio material, and bifrequency means connected to and actuated by said relay to alter the frequency of said bifrequency means downward when said relay is operated by said delayed positive pulse.

References Cited in the file of this patent
UNITED STATES PATENTS

| | | |
|---|---|---|
| 2,141,203 | Abbott | Dec. 27, 1938 |
| 2,503,083 | Waller | Apr. 4, 1950 |
| 2,529,097 | Mullin | Nov. 7, 1950 |
| 2,637,785 | Charlin | May 5, 1953 |
| 2,693,127 | Ortman | Nov. 2, 1954 |
| 2,760,137 | Andrews | Aug. 21, 1956 |